United States Patent
Polastri et al.

(10) Patent No.: US 11,001,721 B2
(45) Date of Patent: May 11, 2021

(54) POWDER COMPOSITION

(71) Applicant: SOLVAY SPECIALTY POLYMERS ITALY S.P.A., Bollate (IT)

(72) Inventors: Fabio Polastri, Monza (IT); Fulvia Roncati, Alessandria (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 171 days.

(21) Appl. No.: 15/501,624

(22) PCT Filed: Jul. 29, 2015

(86) PCT No.: PCT/EP2015/067351
§ 371 (c)(1),
(2) Date: Feb. 3, 2017

(87) PCT Pub. No.: WO2016/020231
PCT Pub. Date: Feb. 11, 2016

(65) Prior Publication Data
US 2017/0226357 A1    Aug. 10, 2017

(30) Foreign Application Priority Data
Aug. 4, 2014   (EP) .................................. 14179701

(51) Int. Cl.
| | | |
|---|---|---|
| *C09D 11/106* | (2014.01) | |
| *C08K 5/42* | (2006.01) | |
| *C08K 3/28* | (2006.01) | |
| *C08L 27/18* | (2006.01) | |
| *C08L 83/04* | (2006.01) | |
| *C09D 11/03* | (2014.01) | |
| *C09D 11/102* | (2014.01) | |
| *C09D 127/18* | (2006.01) | |

(52) U.S. Cl.
CPC .............. *C09D 11/106* (2013.01); *C08K 3/28* (2013.01); *C08K 5/42* (2013.01); *C08L 27/18* (2013.01); *C08L 83/04* (2013.01); *C09D 11/03* (2013.01); *C09D 11/102* (2013.01); *C09D 127/18* (2013.01)

(58) Field of Classification Search
CPC ..... C09D 11/106; C09D 11/03; C09D 11/102; C09D 127/18; C08K 3/28; C08K 5/42; C08L 27/18; C08L 83/04
See application file for complete search history.

(56) References Cited

U.S. PATENT DOCUMENTS

| | | | |
|---|---|---|---|
| 3,931,084 A | 1/1976 | Buckley et al. | |
| 5,118,788 A * | 6/1992 | Hosokawa | C08J 3/12 |
| | | | 526/255 |
| 5,846,454 A | 12/1998 | Koczo et al. | |
| 5,879,746 A | 3/1999 | Tomihashi et al. | |
| 6,114,448 A | 9/2000 | Derbes | |
| 6,177,481 B1 | 1/2001 | Grape et al. | |
| 2011/0218311 A1 | 9/2011 | Smith et al. | |
| 2013/0122302 A1 * | 5/2013 | Miyamoto | C08F 2/20 |
| | | | 428/402 |

FOREIGN PATENT DOCUMENTS

| | | |
|---|---|---|
| CA | 487234 A | 10/1952 |
| EP | 1279694 A1 | 1/2003 |
| EP | 2810958 A1 | 12/2014 |
| GA | 1226222 A | 3/1971 |
| GB | 860299 A | 2/1961 |
| GB | 966814 A | 8/1964 |
| JP | H10-071302 B | 9/1999 |
| JP | H11-099303 A | 10/2000 |
| WO | 94/05729 A1 | 3/1994 |
| WO | 99/21927 A1 | 5/1999 |
| WO | 2014037375 A | 3/2014 |

OTHER PUBLICATIONS

Tuminello W.H. et al., "Poly(tetrafluoroethylene): molecular weight distributions and chain stiffness", Macromolecules, 1988, vol. 21, pp. 2606-2610—American Chemical Society.
Gangal S.V., "Polytetrafluoroethylene", Kirk-Othmer Encyclopedia of Chemical Technology, 1994, 4th Edition, vol. 11, p. 637-639, John Wiley and Sons.
Ooki, M. et al., Dictionary of Chemistry [non-official translation], Tokyo Kagaku Doujin, 1994, pp. 674-675.

* cited by examiner

*Primary Examiner* — John E Uselding
(74) *Attorney, Agent, or Firm* — Osha Bergman Watanabe & Burton LLP

(57) ABSTRACT

The present invention relates to a composition that includes a PTFE powder, a surfactant, at least one of a polyalkylsiloxane, a polyalkylarylsiloxane, a fatty acid, a fatty acid salt, an alkyl- or alkyl aryl-fatty acid ester, a phosphate trialkyl or triaryl ester, an alkyl fluorosilicone, a C12-C40 alkane, a vegetable oil or a paraffin wax, and a salt. The present invention also relates to aqueous system that includes such composition and to uses thereof.

18 Claims, No Drawings

POWDER COMPOSITION

This application is a U.S. national stage entry under 35 U.S.C. § 371 of International Application No. PCT/EP2015/067351 filed Jul. 29, 2015, which claims priority to European application No. EP 14179701.6 filed on Aug. 4, 2014. The entire contents of these applications are explicitly incorporated herein by this reference.

TECHNICAL FIELD

The present invention relates to a composition comprising a PTFE powder, a surfactant, a polyalkylsiloxane, a polyalkylarylsiloxane, a fatty acid, a fatty acid salt, an alkyl- or alkyl aryl-fatty acid ester, a phosphate trialkyl or triaryl ester, an alkyl fluorosilicone, a $C_{12}$-$C_{40}$ alkane, a vegetable oil and a paraffin wax and a salt, to an aqueous system comprising said composition and to uses thereof.

BACKGROUND ART

The synthetic polymer PTFE (polytetrafluoroethylene) is widely used in fields ranging from cookware and domestic appliances to the aerospace industry, due to its desirable characteristics including high solvent resistance, high impermeability to liquids and gases, excellent thermal stability and chemical inertness.

PTFE is practically insoluble in all commonly used organic solvents and it is inert also towards strong acid and basic reagents.

PTFE is very hydrophobic and neither water nor water-containing substances wet it, such that stable suspensions of PTFE particles in water are not known.

U.S. Pat. No. 6,114,448 A (DERBES, D. M.) relates to a semi-solid wax-like intimate mixture of a fluoropolymer and a normally liquid polysiloxane and does not mention dispersions or suspensions of fluoropolymers in aqueous media.

U.S. Pat. No. 3,931,084 A (IMPERIAL CHEMICAL INDUSTRIES LIMITED) relates to fluorocarbon aqueous composition comprising PTFE, a film builder and an adhesive.

A water-based suspension comprising PTFE particles dispersed in an organic solvent would be useful, for example, as an ingredient in the printing or painting/coating fields.

It is an aim of the present invention to provide a composition comprising PTFE powder that is sufficiently dispersible in aqueous media to be formulated and to remain dispersed in said aqueous media, so as to possess in dispersed form a shelf-life to suit requirements for end use applications such as coating, painting and printing.

SUMMARY OF INVENTION

In the present invention, this aim is achieved by a composition comprising a) a PTFE powder, b) an anionic or non-ionic surfactant, c) at least a substance selected from a polyalkylsiloxane, a polyalkylarylsiloxane, a fatty acid, a fatty acid salt, an alkyl- or alkylaryl-fatty acid ester, a phosphate trialkyl or triaryl ester, an alkyl fluorosilicone, a $C_{12}$-$C_{40}$ alkane, a vegetable oil, a paraffin wax and d) an inorganic salt, wherein the D50 average size of PTFE particles in the powder a) is from 1 to 50 μm.

This aim is also achieved by an aqueous system comprising water and said PTFE powder-comprising composition.

The present invention also provides an ink, a paint or a coating comprising said composition or said aqueous system.

The present invention also pertains to the use of said composition or aqueous system for the production of an ink, a paint or a coating.

DESCRIPTION OF EMBODIMENTS

In the context of the present invention, the term "PTFE powder" indicates a plurality of fine particles that consist of a polymer obtained from the polymerization of tetrafluoroethylene (TFE).

The PTFE polymer suitable for being used in the composition of the present invention generally is a polymers of tetrafluoroethylene. Within the scope of the present invention, it is understood, however, that the PTFE polymer may also comprise minor amounts of one or more co-monomers such as, but not limited to, hexafluoropropylene, perfluoro (methyl vinyl ether), perfluoro(propyl vinyl ether), perfluoro-(2,2-dimethyl-1,3-dioxole), and the like, provided, however that the latter do not significantly adversely affect the unique properties of the tetrafluoroethylene homopolymer, such as thermal and chemical stability. Preferably, the amount of such co-monomer does not exceed about 3 mole percent (herein "mol percent"), and more preferably less than about 1 mol percent; particularly preferred is a co-monomer content of less than 0.5 mol percent. In the case that the overall co-monomer content is greater than 0.5 mol percent, it is preferred that the amount of the perfluoro(alkyl vinylether) co-monomer is less than about 0.5 mol percent. Most preferred are PTFE homopolymers.

The PTFE powder in the composition of the present invention consists essentially of particles having a D50 average size from 1 to 50 μm.

In the context of the present invention, the indication that a composition or "consists essentially" of a certain substance indicates that such substance forms at least 95%, preferably at least 99% and more preferably 99.9% in weight of the composition.

For the purpose of the present invention, the D50 average value of the particle size indicates a particle size, such as 50 weight percent of the relevant material have a larger particle size and 50 weight percent have a smaller particle size of the average value.

The D50 average size of the particles in the composition of the present invention can be determined via a method known to the person skilled in the art, for example the D50 value of the PTFE polymer particle size is measured via light scattering techniques (dynamic or laser) using the respective equipment, for example available from the companies Malvern (e.g. Mastersizer® Micro or 3000) or Coulter (e.g. LS 230®), as notably described in the method ISO 13320-1, in EP 1279694 A and in WO 2014/037375. Laser light scattering, based on the light diffraction on the particles, is a suitable technique that can be applied to this kind of powder for determining particle size distribution. In particular the analysis can be performed on dry powder (for instance using a Coulter LS 13320® instrument) or on the powder suspended into a water solution of apposite dispersant (a suitable apparatus is Coulter LS 230®).

For the purpose of the present invention, the second melting temperature of the PTFE polymer of the present invention can be measured according to the ASTM D 3418 method. It is understood that the melting point recorded at the second heating period is hereby referred to as the melting point of the PTFE polymer of the present invention ($T_m$n).

Differential Scanning calorimeter can be used for determining melting point (first and second fusion) and crystallization parameters of the powder in the composition according to the present invention, applying the method directly on the dry powder.

The PTFE polymer in the composition of the present invention may advantageously have a melting temperature ($T_mn$) equal to or below 324° C., preferably equal to or below 323° C., more preferably equal to or below 322° C.

While lower boundary or the melting temperature ($T_mn$) of the PTFE polymer is not critical, it is nevertheless generally understood that PTFE polymers suitable for being used in this invention may generally possess a melting temperature ($T_mn$) of at least 320° C.

Good results were obtained with PTFE polymers having a melting temperature of 320° C. to 330° C.

The PTFE polymer in the composition of the present invention has advantageously a melt viscosity (MV) from 50 to $1 \times 10^5$ Pa·s at 372° C. measured in accordance with the procedure of ASTM D-1238-52T, the whole contents of which is herein incorporated by reference, preferably MV of the PTFE polymer is from 100 to $1 \times 10^4$ Pa·s at 372° C. in accordance with the procedure of ASTM D-1238-52T.

The PTFE polymer in the composition of the present invention is in general characterized by a melt flow rate (MFR) at 372° C. and under a load of 2.16 kg, as measured in accordance with ASTM method D1238, from about 0.10 g/10 min to about 200 g/10 min.

In a specific embodiment of the present invention, the melt flow rate (MFR) of the PTFE polymer is measured at 325° C. and under a load of 225 g, as measured in accordance with ASTM method D1238, and the MFR in general can vary from about 0.10 g/10 min to about 200 g/10 min.

The PTFE polymers of the present invention can be synthesized according to any standard chemical method for the polymerization of tetrafluoroethylene as described in detail in the literature, such as notably by W. H. Tuminello et al, Macromolecules, Vol. 21, pp. 2606-2610 (1988); notably in Kirk-Othmer, The Encyclopedia of Chemical Technology, 4th Ed., pub. by John Wiley and Sons (1994) on pp 637-639 of Vol. 11, notably in US 2011/0218311 A1 and as practiced in the art. These publications notably describe the low molecular weight tetrafluoroethylene polymers as being obtained by polymerization or by controlled degradation of common, high molecular weight PTFEs or low co-monomer content copolymers thereof, for example by controlled thermal decomposition, electron beam, gamma- or other radiation, and the like. Said so-obtained low molecular weight PTFE are often described as "PTFE micropowders", as notably defined in the standard classification of ASTM D5675-13.

As used herewith the term "aqueous system" indicates a biphasic system comprising water and a solid phase (essentially consisting of the PTFE particles and of the other components, if undissolved), which can be in different states ranging from the form of an homogeneous suspension to that of a mixture having a sediment or settled precipitate and a transparent or turbid supernatant aqueous phase.

Within the context of the present invention, the terms "fatty acid" and "fatty alcohols" indicate a carboxylic acid or an alcohol respectively, with a linear $C_4$-$C_{32}$ aliphatic chain, which is either saturated or unsaturated.

Within the context of the present invention, the term "paraffin wax" indicates a mixture of linear hydrocarbon molecules containing from twenty and forty carbon atoms.

As used herewith, the term "surfactant" indicates a substance capable of lowering the superficial tension between a solid (in the present case, the PTFE particles) and water.

Anionic surfactants have a chemical structure with a lipophilic end and a hydrophilic end, the latter comprising an anionic functional group. Non-limiting examples of such anionic groups include sulphate, sulphonate, phosphate, phosphonate, and carboxylate groups.

Examples of anionic surfactants which can be used in the present invention, also in combination with non-ionic surfactants, include high molecular weight sulphates and sulphonates for example alkyl, aryl and alkylaryl sulphates and alkyl-, aryl- and alkylarylsulphonates of sodium and potassium, such as sodium 2-ethylhexyl sulphate, potassium 2-ethylhexyl sulphate, sodium nonyl sulphate, sodium undecyl sulphate, sodium tridecyl sulphate, sodium pentadecyl sulphate, sodium lauryl sulphate, sodium methylbenzenesulphonate, potassium methylbenzenesulphonate, potassium toluenesulphonate and sodium xylenesulphonate, the sulphonated derivatives of the nonionic surfactants listed below; the salt of phosphonic acid esters of nonionic surfactants listed below; dialkyl esters of alkali metal salts of sulphosuccinic acid, such as sodium diamylsulphosuccinate; and condensation products of formaldehyde/naphthalenesulphonic acid.

Exemplary non-ionic surfactants are long-chain compounds such as alcohols (e.g. fatty alcohols) and alcohol derivatives (e.g. alkylpolyethoxylated alcohols), which do not carry anionic or cationic groups on their structure.

Further examples of non-ionic surfactants include polyglucosides such as alkylpolyglucoside, polyethers such as condensates of ethylene oxide and propylene oxide, alkyl and alkylaryl ethers and thioethers of polyethylene glycols and polypropylene glycols, alkylphenoxypoly(ethylenoxy) ethanols, polyoxyalkylene derivatives of partial esters of long-chain fatty acids such as lauric, myristic, palmitic and oleic acids, condensates of ethylene oxide with higher alkane thiols, ethylene oxide derivatives of long-chain carboxylic acids and of alcohols, etc. These non-ionic surfactants can contain approximately 5 to 100 ethylene oxide units per molecule and, preferably, approximately 20 to 50 of such units.

The term "dialkyl sulphosuccinate" as used herein indicates a dialkyl ester of sulphosuccinic acid having the following general formula:

$$P^1\text{—OOC—CH}_2\text{—CH(SO}_3\text{H)—COO—}P^2$$

wherein $P^1$ and $P^2$, equal or different, are linear, cyclic or branched, when possible, alkyl groups, optionally containing one or more unsaturations when possible, having a number of carbon atoms from 1 to 30.

Derivatives of dialkyl sulphosuccinates include salts such as metal salts, ammonium salts (in particular the $NH_4^+$ salt) and any form of the compound in which the sulphonic acid group ($SO_3H$) is present as the sulphonate —$S(O)_2$—$O^-$, as well as solvates.

The two alkyl groups $P^1$ and $P^2$ of the dialkyl sulphosuccinate may be for example $C_1$ to $C_{18}$ alkyl groups, in particular $C_2$ to $C_{12}$ or $C_2$ to $C_{10}$ alkyl groups, such as $C_6$ to $C_{10}$ and in particular $C_8$. Thus the dialkyl sulphosuccinate is suitably a dioctyl sulphosuccinate. The alkyl groups may be substituted or unsubstituted. If substituted, they may for example be mono-, di- or tri-substituted, and may suitably include one or more substituents selected from amido groups and ethers. They may be either straight chain or branched. They may include one or more unsaturated carbon-carbon bonds. In an embodiment of the invention, the alkyl groups of the dialkyl sulphosuccinate are not substituted with ether groups.

The dialkyl sulphosuccinate or derivative is conveniently used in the form of a salt in which the sulphonic acid group is present as the sulphonate —S(O)₂—O⁻, such as in particular a metal salt or ammonium salt. Suitable metal salts include the alkali metal salts (for example the sodium or potassium salts, in particular the former) and the alkaline earth metal salts (for example the calcium salt).

In an embodiment of the invention, the dialkyl sulphosuccinate can be used in the form of its sodium salt, for example dioctyl sodium sulphosuccinate (also known as dioctyl sulphosuccinate sodium or docusate sodium).

As used herewith, the term "alkylpolyalkoxylate" indicates a $C_2$-$C_{30}$ alkyl alcohol polyether comprising recurring units derived from an alkylene oxide. The alkylpolyalkoxylate general formula is the following:

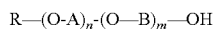

wherein R is a $C_2$-$C_{30}$ alkyl group, n and m, equal or different from each other, can be 0 or an integer ranging from 1 to 18, with the proviso that at least one of m and n is different from 0, and A and B are each independently from the other, if present, a linear or branched $C_2$ to $C_8$ alkyl group. As non-limiting examples, A and B can be an ethyl or 1,2-propyl group, m and n can be independently 0 or range between 6 and 18 and R can be a $C_8$-$C_{18}$ group.

As used herewith, the terms "polyalkyl polysiloxanes" or "polyalkylsiloxane" or "Polymerized siloxanes" or "silicones" indicate polymers with the general chemical formula $[R_2SiO]n$, where R is an organic group such as methyl, ethyl, propyl, butyl or octyl. These materials comprise a silicon-oxygen backbone (Si—O—Si—O—Si—O— . . . ) with organic side groups attached to the silicon atoms, which are coordinated to four atoms. The backbone can be linear or branched. Optionally, polyalkylsiloxane can be supported or grafted on support materials such as starch, e.g. in the form of a starch encapsulated silicone compound (such as the commercial product Rhodosil® EP-6703).

As used herein, the term "alkyl fluorosilicone" indicates (ii) a fluorosilicone resin essentially consisting of at least one $R_3SiO_{1/2}$ (M) unit and at least one $SiO_4/2$ (Q) unit wherein R is independently selected from the group consisting of a monovalent hydrocarbon group having from 1 to 10 carbon atoms, an alkenyl group having from 2 to 10 carbon atoms, and a fluorine atom-containing group having the formula —$R^1B$ wherein $R^1$ is an alkylene group having at least 2 carbon atoms and B is a perfluoroalkyl group having from 1 to 12 carbon atoms, the molar ratio of M units to Q units ranges from 0.8/1 to 4/1, and with the proviso that there is on average at least one fluorine atom-containing group, as defined above, per molecule.

Each perfluoroalkyl group, B, is bonded to a silicon atom by way of $R^1$, an alkyl group which separates B from Si by at least two carbon atoms. Each $R^1$ group can have a normal or branched structure and each perfluoroalkyl group B can have a normal or a branched structure and can have 1 to 12 carbon atoms.

Unless otherwise specified, in the context of the present invention all percentages are relative to the ratio of the weight of a specific component of a mixture divided by the total weight of the mixture (indicated as wt/wt).

In one embodiment, the present invention provides a composition comprising a) a PTFE powder, b) an anionic or non-ionic surfactant, c) at least a substance selected from a polyalkylsiloxane, a polyalkylarylsiloxane, a fatty acid, a fatty acid salt, an alkyl- or alkylaryl-fatty acid ester, a phosphate trialkyl or triaryl ester, an alkyl fluorosilicone, a $C_{12}$-$C_{40}$ alkane, a vegetable oil, a paraffin wax and d) an inorganic salt, wherein the D50 average size of PTFE particles in the powder a) is from 1 to 50 μm.

It was found that the composition according to the invention is readily wettable and dispersible in water, i.e. a homogeneous suspension is obtained upon dispersion of the solid composition of the invention in water. This is particularly surprising in view of the fact that PTFE powders are known to form aggregates and/or to precipitate rapidly when they are contacted with water, due to their inherent hydrophobicity. On the contrary, the composition of the invention provides a stable dispersion in water that can be used in the formulation of liquid or semiliquid product, such as inks or paints.

This is particularly advantageous because it was found that the use of suspended PTFE particles can confer at least part of the properties of PTFE to the liquid or semiliquid product.

It was also found that the composition of the present invention can be easily dispersed in water to form a homogeneous suspension upon mild stirring for a short time (5-10 min) and at room temperature (20-25° C.) without formation of foam, which would be detrimental to the processability of the suspension thus formed.

The suspension thus obtained is stable and homogeneous for at least 1-5 hours following the preparation. It was advantageously found that any precipitate that should be observed upon storage can be readily and homogeneously suspended by mild shaking of the system. The dispersibility is excellent and a homogeneous suspension, substantially identical to the initial one, can be promptly obtained also after 40 days of storage without motion at room temperature.

Preferably, the PTFE polymer of the composition of the present invention is a low molecular weight polymer, i.e. a polymer having a number averaged molecular weight (Mn) advantageously equal to or below 700000, preferably equal to or below 200000, preferably equal to or below 100000, preferably equal to or below 90000, more preferably equal to or below 50000, more preferably equal to or below 20000, as determined via MV measured according to the ASTM D1238-52T method.

Preferably, in the composition of the invention the D50 average size of particles in the PTFE powder a) is from 2 to 20 μm, more preferably from 3 to 13, even more preferably from 3.5 to 9, from 4 to 6 or from 5 to 6 μm.

In one preferred embodiment, the PTFE powder a) in the composition of the present invention has a D50 particle size of about 2-8 μm and a surface area of about 3.0-10 m²/g.

The PTFE powder a) in the composition of the invention may be produced by a method comprising a treatment of micronization, for instance by irradiation, that decreases molecular weight, allowing different applications and improving some characteristics such as those connected to rheology.

In one preferred embodiment, the PTFE powder in the composition of the present invention has a D50 particle size of about 4 μm and a surface area of about 7.5 m²/g.

In one preferred embodiment, the PTFE powder in the composition of the present invention has a D50 particle size of about 4 μm and a surface area of about 3 m²/g.

In one preferred embodiment, in the composition of the present invention the anionic or non-ionic surfactant comprises one or more of a sulphosuccinate surfactant, an alkylbenzene sulphonate, an alkylaryl ether, an alkylaryl thioether, an alkyl polyalkoxylate, an aryl-polyalkoxylate, a phosphate monoalkyl- or dialkyl ester, a phosphate monoaryl- or diaryl ester, a polyether-polyester copolymer, a $C_4$-$C_{30}$ alkyl amine, $C_4$-$C_{30}$ alkyl amide or a salt thereof. Non-limiting examples of suitable salts are ammonium salts, alkali metal salts and alkaline earth metal salts.

More preferably, in the composition of the present invention the anionic surfactant comprises a sulphosuccinate surfactant, or a salt thereof.

More preferably, in the composition of the present invention the sulphosuccinate surfactant comprises a dialkylsulphosuccinate, or a salt thereof.

Even more preferably, in the composition of the present invention the dialkylsulphosuccinate surfactant comprises dioctylsulphosuccinate or dioctylsulphosuccinate sodium salt.

More preferably, in the composition of the present invention the sulphosuccinate surfactant comprises a dialkylsulphosuccinate, or a salt thereof. More preferably, in the composition of the present invention the sulphosuccinate surfactant comprises dioctylsulphosuccinate or dioctylsulphosuccinate sodium salt.

Preferably, in the composition of the present invention the anionic surfactant comprises an alkyl- or alkylbenzene sulphonate salt, such as a sodium salt. As a non-limiting example, the anionic surfactant may comprise dodecylbenzenesulphonic acid sodium salt, sodium dodecyl sulphate, sodium lauryl ether sulphate, sodium diethylene glycol myristyl ether sulphate and mixtures thereof, optionally in mixture with a polymer such as a 2,5-furandione/2,4,4-trimethylpentene polymer.

Preferably, in the composition of the present invention the non-ionic surfactant comprises a polyether-polyester copolymer. More preferably, in the composition of the present invention the surfactant comprises a mixture of an alkylbenzene sulphonate salt, such as a sodium salt, and a polyether-polyester copolymer, for example in a 1:9 weight ratio.

Preferably, in the composition of the present invention the non-ionic surfactant comprises an alkyl or aryl-polyalkoxylated alcohol, such as an alkyl- or aryl-ethoxylate or an alkyl- or aryl-propenoxylate, more preferably an alkylpolyethoxylated alcohol, more preferably an alkylpolyethoxylated $C_{16}$/$C_{18}$ alcohol, i.e. a fatty alcohol polyglycol ether based on $C_{16}$/$C_{18}$ alcohol, even more preferably a $C_{16}$/$C_{18}$ alcohol having 25 mol ethylene oxide.

The composition according to the present invention comprises at least one of a polyalkylsiloxane (such as a silicone fluid), a polyalkylarylsiloxane, a fatty acid, a fatty acid salt (such as tall oil, aluminium stearate, calcium/aluminium/zinc salt of a fatty acid), an alkyl- or alkyl aryl-fatty acid ester, a phosphate trialkyl or triaryl ester (preferably tributyl phosphate), an alkyl fluorosilicone, a $C_{12}$-$C_{40}$ alkane, a vegetable oil and a paraffin wax, or mixtures thereof, as component c).

Solid substances are preferred with respect to liquid substances, because solid components can avoid lump formation in the dry powder of the composition according to the invention.

Preferably, the composition according to the present invention comprises at least one polyalkylsiloxane as component c).

Solid polyalkylsiloxanes that were tested resulted particularly efficient in breaking down foam and in avoiding its formation.

It was found that the addition of very low amounts of polyalkylsiloxane is sufficient to eliminate almost completely the formation of foam upon suspension of the composition in aqueous media and upon shaking of the samples after a prolonged lapse of time without motion.

Preferably, in the composition of the present invention the polyalkylsiloxane has general formula $R_1R_2R_3Si$—O—$(SiR_4R_5$—O$)_n$—$SiR_6R_7R_8$, each of $R_1$-$R_8$, being, independently from the others, H or a $C_1$-$C_{20}$ linear or branched alkyl unit, which is the same or different from the other alkyl units, and n being 0 or an integer equal to or higher than 1, more preferably exceeding 100.

Preferably, in the composition of the present invention the polyalkylsiloxane comprises polydimethylsiloxane, more preferably absorbed polydimethylsiloxane, such as polydimethylsiloxane modified starch or polydimethylsiloxane mixed with silica gel.

The composition of the present invention comprises at least one inorganic salt.

In the composition of the present invention, preferably the inorganic salt is selected from an alkali metal or alkaline earth metal sulphate, nitrate, chloride, chlorate, carbonate and a mixture thereof. More preferably, the inorganic salt is an alkali metal sulphate, nitrate, chloride, carbonate, chlorate and a mixture thereof. Even more preferably, the inorganic salt is sodium chloride, lithium chloride, potassium chloride, sodium chloride, lithium chloride, potassium sulphate, sodium chlorate, lithium chlorate, potassium chlorate, lithium nitrate, sodium nitrate, potassium nitrate or a mixture thereof. Even more preferably, the inorganic salt is potassium nitrate.

The ratio of PTFE powder a), anionic or non-ionic surfactant b), component c) and an inorganic salt d) in the composition of the invention may vary, as long as the PTFE powder is the major component.

In one preferred embodiment, in the composition of the invention the amount of PTFE powder a) is 80 to 99%, more preferably 92 to 98%, even more preferably 94 to 97.5% or 95 to 97% in weight over the total weight of the composition.

In one preferred embodiment, in the composition of the invention the amount of the anionic or non-ionic surfactant a) is 0.1 to 5% in weight/total weight of the composition.

In one preferred embodiment, in the composition of the invention the amount of component c) is 0.1 to 5% in weight/total weight of the composition.

In one preferred embodiment, in the composition of the invention the amount of inorganic salt d) is 0.1 to 5% in weight/total weight of the composition.

Preferably, in the composition of the invention the amount of PFTE powder a) is up to 99% in weight/total weight of the composition, the amount of the anionic or non-ionic surfactant a) is 0.1 to 5% in weight/total weight of the composition, the amount of component c) (more preferably polyalkylsiloxane) is 0.1 to 5% in weight/total weight of the composition and the amount of inorganic salt d) is 0.1 to 5% in weight/total weight of the composition.

More preferably, the amount of PTFE powder is 93 to 98% or 94 to 97.5% in weight over the total weight of the composition.

More preferably, the amount of surfactant is 1 to 5%, even more preferably 1.5 to 3% or 2 to 2.5% in weight/total weight of the composition.

More preferably, the amount of the polysiloxane is 1 to 5%, even more preferably 2 to 4 or 3 to 3.5% in weight/total weight of the composition. More preferably, the amount of the inorganic salt is 0.5 to 4%, more preferably 1 to 3 or 1.5 to 2% in weight/total weight of the composition.

As non-limiting examples, the ratio of ingredients (weight/total weight of the composition) in the composition of the invention may be as follows:

PTFE 94%, surfactant 2%, polysiloxane 3%, inorganic salt 1%;

PTFE 95%, surfactant 1.5%, polysiloxane 3%, inorganic salt 0.5%;

PTFE 94%, surfactant 2%, polysiloxane 3%, inorganic salt 1%.

The composition of the invention can be prepared, preferably in the form of a dry powder, by conventional powder mixing techniques known to the person skilled in the art As non-limiting examples, the dry powders can be mixed using a v-Blender or a Plasmec® mechanical mixer with a container suitable to mix efficiently the desired amount of powders (e.g. wherein the total volume of the container is at least double the volume of the powders) and at a suitable mixing rate selected according to the ordinary knowledge of the person skilled in the art.

In an embodiment, the present invention pertains to an aqueous system comprising water and the composition comprising a PTFE powder, an anionic or non-ionic surfactant, a polyalkylsiloxane and an inorganic salt, wherein the D50 average size of PTFE powder particles is from 1 to 50 μm, as described above.

It was found that the aqueous suspensions prepared by addition of water to the composition as described above (or by adding the composition to water) are homogeneous systems wherein the PFTE particles are fully wetted by the aqueous solvent. Contrary to their general behaviour when contacted with water, in the aqueous system of the invention the PFTE particles with D50 average size from 1 to 50 μm do not precipitate or to form aggregates, and remain in suspension for at least 1-5 hours following the preparation. In addition, when the particles are partially or completely deposited on the bottom of the container, light stirring is sufficient to prepare again the homogeneous suspension. Thus, the liquid composition of the invention allows the transfer and accurate dosage of the suspended PFTE particles in an expedient manner. This is particularly advantageous for the formulation of aqueous products such as paint, coating and inks.

In the aqueous system according to the present invention, the amounts of the composition comprising the PTFE powder, of the anionic or non-ionic surfactant, of the polyalkylsiloxane and of the inorganic salt may vary substantially.

Preferably, in the aqueous system according to the present invention the composition comprising the PTFE powder, the anionic or non-ionic surfactant, the polyalkylsiloxane and the inorganic salt is from 0.1 to 20% in weight/total weight of the system. More preferably, the amount of said composition in the aqueous system of the invention is from 1 to 10%, even more preferably from 2 to 9%, from 3 to 8%, from 4 to 7% or from 5 to 6% in weight/total weight of the aqueous system.

In an embodiment, the present invention pertains to an ink, a paint or a coating comprising the composition or the aqueous system as described above.

The ink, paint or coating according to the present invention can be in liquid, solid or semi-solid form. The PTFE particles therein impart to the ink, paint or coating according to the present invention advantageous properties such as improved weatherability, waterproofing and self-cleaning, antiadhesive, and self-lubricating behaviour. The coating and paint according to the present invention can be utilized in various applications such as in the production of kitchen utensils and cookware, for industrial antiadhesion and moving mechanical parts etc. The ink according to the invention can be utilized as a normal printing means for paper, plastics, fabrics, glass etc.

In an embodiment, the present invention pertains to the use of the composition or the aqueous system as described above for the production of an ink, a paint or a coating.

The whole content of all the cited documents is herein incorporated by reference.

Should the disclosure of any patents, patent applications, and publications which are incorporated herein by reference conflict with the description of the present application to the extent that it may render a term unclear, the present description shall take precedence.

The following examples are provided to illustrate with further details the invention and they are not intended to limit its scope.

Examples

Raw Materials

Any of the following PTFE polymers is used in the examples.

P1 is a polytetrafluoroethylene powdered resin, obtained from Solvay Specialty Polymers Italy S.p.A. having an average D50 particle size of 4.5 μm and a melting point $T_m(n)$ of 325+5° C. The bulk density is 400 g/L and the surface area is equal to 3.0 m$^2$/g.

P2 is a polytetrafluoroethylene powdered resin, obtained from Solvay Specialty Polymers Italy S.p.A. having an average D50 particle size of 4 μm and a melting point $T_m(n)$ of 325+5° C. (ASTM D 3418). The bulk density is 325 g/L (ASTM D4895) and the surface area is more than 7.5 m$^2$/g.

P3 is a polytetrafluoroethylene powdered resin, obtained from Solvay Specialty Polymers Italy S.p.A. having an average D50 particle size of 4 μm, a melting point $T_m(n)$ of 326° C.+5° C. (ASTM D 3418). The melt viscosity (MV) is equal to or lower than $1\times10^5$ Pa·s at 372° C. measured according to the ASTM D1238-52T method. The bulk density is 400 g/L (ASTM D4895) and the surface area is 3 m$^2$/g.

The surfactant is one of Geropon® SDS (Sodium Dioctylsuccinate), Geropon® TA/72 (dodecylbenzenesulfonic acid, sodium salt, in mixture with a 2,5-furandione/2,4,4-trimethylpentene polymer), Genapol® T250 (Polyethoxylated $C_{16}/C_{18}$ Alcohol, 25 mol ethylene oxide), Marlon® ARL (sodium alkylbenzene sulphonate) and Marloquest® G82 (polyether-polyester copolymer).

The polyalkylsiloxane is absorbed polymetyhlsiloxane (Rhodorsil® EP6703 obtained from Rhodia®).

The inorganic salt is potassium nitrate.

Particle Size Determination

The average D50 particle size for the PTFE powder is determined as follows (with reference to ISO 13320-1:1999 and subsequent versions).

The particle size of dry or wet powders and their distribution dimensions are determined by a Beckman Coulter L5230 or Beckman Coulter LS13 320 laser particle sizer, capable of investigating the range 0.04 to 2000 microns.

The technique exploits the phenomenon of diffraction of coherent and monochrome electromagnetic wave on the contour of the particles in suspension in an inert liquid. The laser source is in the solid state and has a wavelength of 750 nm. When the laser beam interacts with a particle suspended in an inert liquid and with size greater than that of the wavelength of the incident radiation, it is diffracted by an angle having an amplitude that is a function of the size of the particle impacted: the smaller the particle, the wider the angle of diffraction.

In the instrument, a low-power laser beam generator produces a parallel beam of monochromatic light, a series of lenses allows to expand the beam (beam expander) which will cross an area of the sample cell with parallel and transparent faces: this is the area of measurement of the suspension that is kept under stirring by means of a magnetic stirrer in the case of wet sample or blown as an aerosol into the cell in the case of a dry sample. The particles continue to enter and exit the measurement area during the time of the measurement. The incident light is diffracted at each instant from the sample, producing a spectrum diffraction pattern that evolves, but the integration, in an appropriate period of time and under a continuous flow of particles through the illuminated area, becomes representative of the system. If the sample contains a variety of diameters, the particle size distribution is obtained through the analysis of energy distribution on the various diffraction rings sizes. The diffracted light then, through an optical Fourier transform system, arrives on a multiple detector, which consists of various photoelectric cells. A signal amplifier, an interface and a computer for processing the collected data complete the system and provide the histogram of particle size distribution of the suspension.

The data can be processed according to the Mie theory or to the Fraunhofer theory.

The Fraunhofer theory is appropriate when the particles are larger than the wavelength of the laser.

The Mie theory is more accurate and necessary when the dimensions of the particles are close to the wavelength of the laser, and in this case it is necessary to know the refractive index of both the dispersing medium and of the sample. For particles with $D_{50}>15$ micron the two theories provide the same results, for smaller particles the Mie theory is used. In the case of dry samples, the Fraunhofer model is used also for particles smaller than 15 micron.

Wet Powder Technique

Equipment

Coulter LS230 laser particle sizer with the sample cell type "Micro volume"

Magnetic stirrer and stirring bars

Branson® sonicator

Reagents

Isopropanol (IPA), RPE

Solution A: 0.5 wt % Triton X100 (pure, Dow Chemicals) in demineralized water.

Samples

The samples are dry or moist PTFE powders.

Sample Preparation

The powder (0.1 g) is first dispersed in a 50 ml beaker containing a pre-filtered solution of demineralized water and Triton 0.5% by weight (40 ml) (Solution A) for 5 minutes, and then subjected to sonication for 2 minutes at 30% maximum power of the instrument. The suspension is shaken for 5 minutes prior to analysis in order to prevent foaming and to avoid formation of a polymer suspension at the bottom of the beaker.

Analysis

Solution A prepared as above is placed in the measurement cell, stirring is started and the background signal is measured.

The suspension comprising the sample to be analysed is solution A is then added to the cell (3-5 ml) via a pipette, so as to obtain an obscuration value, as recorded by the instrument software, between 8% and 15% 1.

Three measurements (90 minutes each) are carried out automatically.

The whole procedure is repeated with another specimen of the same powder sample.

Calculations

The end result is the average of six measures.

Statistics are calculated as follows:

$x_m$=average value

DEV.ST: Standard deviation=$(\Sigma(x_i-x_m)^2/(n-1))^{0.5}$; n=N° of measurements CV %=% variation coefficient, $(DEV.ST/x_m)*100$;

r=lab repeatability (2.8*DEV.ST);

(r)=repeatability %, $(r/x_m)*100$

Results

The analysis results are the average diameters of the powder particles expressed in microns (μM), as % by volume relative to 50% (D50 of the entire particle size distribution.

Dry Powder Technique

Equipment

Coulter L5230 laser particle sizer with the sample cell type "Tornado" for dry powder analysis Aluminium weighing bottle with cap Ventilated oven Samples The samples are dry PTFE powders.

Sample Preparation

About 10 g of dry powder are sampled in a clean aluminium weighing bottle with cap. The sample in the weighing bottle and the cap (removed from the container) are dried in a ventilated oven at 105° C. for 30 min. The container is allowed to cool to 20-25° C. and capped. 0.5 g of powder are sampled.

Analysis

Every analysis is carried out ion duplicate at controlled temperature and moisture (22° C.<T<24° C. and 40%<rh<60%). The instrument is cleaned after each analysis.

Calculations

The end result is the average of at least two measurements wherein the D50 standard deviation is below 10%.

Statistics are calculated as follows:

$x_m$=average value

DEV.ST: Standard deviation=$(\Sigma(x_i-x_m)^2/(n-1))^{0.5}$; n=N° of measurements CV %=% variation coefficient, $(DEV.ST/x_m)*100$;

r=lab repeatability (2.8*DEV.ST);

(r)=repeatability %, $(r/x_m)*100$

Results

The analysis results are the average diameters of the powder particles expressed in microns (μM), as % by volume relative to 50% (D50 of the entire particle size distribution.

General Procedure for the Preparation of the Dry Composition

The ingredients (PTFE powder, surfactant, polyalkylsiloxane, inorganic salt) in the selected ratio are placed in a mechanical mixer (eg: Plasmec®). The weight of the total ingredients is 10 kg. The total of the ingredients occupies about half of the available volume of the mixer. The process is performed at room temperature. The ingredients are mixed for 60-300 seconds at about 700 rpm, then stirring is stopped and the mixture is left at rest for 60-120 seconds. Mixing is then resumed at about 1070 rpm for 30-120 seconds. A homogeneous dry composition is obtained.

The following dry compositions are prepared.

TABLE 1

| PTFE type | PTFE % | Geropon SDS (surfactant) | Rhodorsil EP/6703 (polysiloxane) | KNO$_3$ salt |
|---|---|---|---|---|
| P1 | 94 | 2 | 3 | 1 |
| P2 | 95 | 1.5 | 3 | 0.5 |
| P3 | 94 | 2 | 3 | 1 |

Preparation of the Aqueous System

The dry composition obtained as above (2 g) is added to 20 ml of demineralized water in a 50 ml glass tube. The tube is then mixed by manual agitation for 3-5 min until a visually homogeneous dispersion is obtained.

The following samples are prepared using.

TABLE 2

| Sample | PTFE % | Surfactant Type | Polysiloxane % | Salt % |
|---|---|---|---|---|
| 1 | 94.9 | A | 2 | 3 | 0.1 |
| 2 | 100.0 | A | 0 | 0 | 0 |
| 3 | 94.5 | A | 2 | 3 | 0.5 |
| 4 | 98.0 | A | 2 | 0 | 0 |
| 5 | 97.5 | A | 2 | 0 | 0.5 |
| 6 | 98.0 | B | 2 | 0 | 0 |
| 7 | 98.0 | C | 2 | 0 | 0 |
| 8 | 98.0 | D | 2 | 0 | 0 |

PTFE types: comparable results were obtained using P1, P2 or P3 for the preparation of the samples in Table 2
Surfactant types:
A: Sodium Dioctylsuccinate
B: Sodium dodecylbenzene sulfonate in mixture with a 2,5-furandione/2,4,4-trimethylpentene polymer
C: alkylpolyethoxylated C$_{16}$/C$_{18}$ Alcohol, 25 mol ethylene oxide
D: sodium alkylbenzene sulphonate 10% wt/wt and polyether-polyester copolymer 90% wt/wt.

Conductivity

The conductivity is measured via a conductimeter at 20° C., immediately after the preparation of the homogenous dispersion. The results are expressed in μS/cm.

Determination of Foam Formation

This analysis is done observing the sample immediately after the suspension sample preparation. The result "yes" indicates that formation of foam has occurred; "no" means the complete absence of foam; "few" represents the intermediate condition.

Dispersibility after 40 Days at Room Temperature

For this analysis the sample is prepared (as described in the "system preparation") and stored at rest for 40 days at room temperature (20-25° C.). After this lapse of time, PTFE powder results visually separated from water, the sample is then re-mixed by mechanical agitation for 5 minutes (mixer: "Forlab® MT 135").

The results "easy" and "very easy" indicate that a homogenous dispersion is obtained after the 5 min agitation time or needs less time; "difficult" indicates that a longer agitation is needed for obtaining a homogenous dispersion; instead when the result is "impossible" homogenous dispersion cannot be obtained in any way.

Top Phase Transparency

The determination is done after 24 hours from that the aqueous system sample has been prepared and left at rest, after this lapse of time the powder lays mainly on the bottom of the test tube and is separated from water. The top phase is prevalently composed of water. The analysis results are expressed comparing the top phase with apposite standard and attributing a value "+", "++" or "+++" on the base of the visual observation. "+" means the lowest transparency, "+++" the highest.

Dispersibility after One Week at 60° C.

For this analysis the sample is prepared (as described in the "sample preparation") and stored at rest 7 days at 60° C. in an oven. After this lapse of time, PTFE powder results visually separated from water, the sample is then remixed by mechanical agitation for 5 minutes (mixer: "Forlab® MT 135").

The results "easy" and "very easy" indicate that a homogenous dispersion is obtained after the 5 min agitation time or needs less time; "difficult" means that a longer agitation is needed for obtaining a homogenous dispersion; instead when the result is "impossible" homogenous dispersion cannot be obtained in any way.

The results are summarized in the following Table 3.

TABLE 3

| # | Comp % wt/wt | H$_2$O % wt/wt | Wet. | Cond | FF | Dis 40 d | TPT | Dis 7 d |
|---|---|---|---|---|---|---|---|---|
| 1 | 1 | 99 | e | 5445 | no | e | ++ | e |
| 1 | 10 | 90 | e | 5643 | no | v | ++ | e |
| 2 | 1 | 99 | i | 54 | yes | i | +++ | w |
| 2 | 10 | 90 | d | 426 | few | d | +++ | i |
| 3 | 10 | 90 | e | 23760 | no | v | +++ | e |
| 4 | 10 | 90 | d | 421 | yes | d | + | w |
| 5 | 10 | 90 | e | 23958 | yes | e | ++ | e |
| 6 | 10 | 90 | d | — | yes | d | + | — |
| 7 | 10 | 90 | d | — | yes | d | ++ | — |
| 8 | 10 | 90 | d | — | yes | d | + | — |

# = number of the composition sample (referring to Table 2)
Comp % = amount of composition sample according to Table 2 added to the aqueous system
H$_2$O % = amount of water in the system
Wet. = wettability
Cond = conductivity
FF = formation of foam
Dis 40 d = dispersibility after 40 days at 20-25° C.
TPT = Top phase transparency (+ = poorly transparent; ++ = medium transparent; +++ = very transparent)
Dis 7 d = dispersibility after 7 days at 60° C.
v = very easy
e = easy
d = difficult
i = impossible
w = wet, but flocculated The samples comprising the compositions according to the present invention have excellent dispersibility upon mild and brief stirring, even after prolonged storage at room temperature (40 days) and at higher temperature (7 days at 60° C.). In addition, the compositions according to the invention are easy to produce, also on a large scale, and are easily dispersible in water with little or no production of foam.

The invention claimed is:

1. A composition comprising: a) a PTFE powder, b) an anionic or nonionic surfactant, c) at least one substance selected from a polyalkylsiloxane or a polyalkylarylsiloxane and d) an inorganic salt, wherein the composition is a dry powder and wherein the D50 average size of PTFE particles in the powder a) is from 1 to 50 μm.

2. The composition according to claim 1, wherein the D50 average size of the PTFE particles in the powder a) is from 2 to 20 μm.

3. The composition according to claim 1, wherein the anionic or nonionic surfactant comprises one or more of a sulphosuccinate surfactant, an alkyl benzene sulphonate, an alkylaryl ether, an alkylaryl thioether, an alkyl polyalkoxylate, an arylpolyalkoxylate, a phosphate monoalkyl-or dialkyl ester, a phosphate monoaryl- or diaryl ester, a polyether-polyester copolymer, a $C_4$-$C_{30}$ alkyl amine, $C_4$-$C_{30}$ alkyl amide or a salt thereof.

4. The composition according to claim 3, wherein the sulphosuccinate surfactant comprises a dialkylsulphosuccinate, or a salt thereof.

5. The composition according to claim 4, wherein the dialkylsulphosuccinate surfactant comprises a dioctylsulphosuccinate.

6. The composition according to claim 3, wherein the polyalkoxylate surfactant comprises an alkylpolyethoxylate.

7. The composition according to claim 1, wherein the polyalkylsiloxane has general formula $R_1R_2R_3Si$—O—$(SiR_4R_5$—$O)_n$—$SiR_6R_7R_8$, each of $R_1$-$R_8$ being a $C_1$-$C_{12}$ linear or branched alkyl unit, which is the same or different from the other alkyl units, and n being 0 or an integer equal to or higher than 1.

8. The composition according to claim 7, wherein the polyalkylsiloxane comprises polydimethylsiloxane.

9. The composition according to claim 1, wherein the inorganic salt is selected from an alkali metal or alkaline earth metal sulphate, nitrate, chloride, carbonate, chlorate and a mixture thereof.

10. The composition according to claim 9, wherein the inorganic salt is potassium nitrate.

11. The composition according to claim 1, wherein the amount of PFTE powder is greater than zero and up to 99% in weight/total weight of the composition and/or the amount of the anionic or non-ionic surfactant is 0.1 to 5% in weight/total weight of the composition and/or the amount of polyalkylsiloxane is 0.1 to 5% in weight/total weight of the composition and/or the amount of inorganic salt is 0.1 to 5% in weight/total weight of the composition.

12. An aqueous system comprising water and the composition of claim 1.

13. The aqueous system according to claim 12 wherein the composition comprising the PTFE powder, the anionic or non-ionic surfactant, the polyalkylsiloxane and the inorganic salt is from 0.1 to 20% in weight/total weight of the system.

14. An ink, a paint or a coating comprising the composition of claim 1.

15. A method for producing an ink, a paint or a coating, the method comprising using the composition of claim 1 to formulate a liquid or semi-liquid product.

16. The composition according to claim 5, wherein the dialkylsulphosuccinate surfactant comprises a dioctylsulphosuccinate sodium salt.

17. The composition according to claim 1, wherein
the anionic or non-ionic surfactant comprises one or more of a sulphosuccinate surfactant, an alkylbenzene sulphonate, an alkylaryl ether, an alkylaryl thioether, an alkyl polyalkoxylate, an aryl-polyalkoxylate, a phosphate monoalkyl-or dialkyl ester, a phosphate monoaryl- or diaryl ester, a polyether-polyester copolymer, a $C_4$-$C_{30}$ alkyl amine, $C_4$ to $C_{30}$ alkyl amide or a salt thereof;
the polyalkylsiloxane has general formula $R_1R_2R_3Si$—O—$(SiR_4R_5$—$O)_n$—$SiR_6R_7R_8$, each of $R_1$-$R_8$ being a $C_1$-$C_{12}$ linear or branched alkyl unit, which is the same or different from the other alkyl units, and n being 0 or an integer equal to or higher than 1; and
the inorganic salt is selected from an alkali metal or alkaline earth metal sulphate, nitrate, chloride, carbonate, chlorate and a mixture thereof.

18. The composition according to claim 17, wherein the amount of PFTE powder is greater than zero and up to 99% in weight/total weight of the composition and/or the amount of the anionic or non-ionic surfactant is 0.1 to 5% in weight/total weight of the composition and/or the amount of polyalkylsiloxane is 0.1 to 5% in weight/total weight of the composition and/or the amount of inorganic salt is 0.1 to 5% in weight/total weight of the composition.

* * * * *